US006374934B1

(12) United States Patent
Beck et al.

(10) Patent No.: US 6,374,934 B1
(45) Date of Patent: Apr. 23, 2002

(54) ONE-SEAT MOTOR VEHICLE

(75) Inventors: Peter Beck, Stuttgart; Reinhold Langbein; Jürgen Wojatschek, both of Esslingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/463,742

(22) PCT Filed: Jul. 16, 1998

(86) PCT No.: PCT/EP98/04446

§ 371 Date: Mar. 23, 2000

§ 102(e) Date: Mar. 23, 2000

(87) PCT Pub. No.: WO99/06002

PCT Pub. Date: Feb. 11, 1999

(30) Foreign Application Priority Data

Jul. 31, 1997 (DE) .......................................... 197 33 033

(51) Int. Cl.[7] ................................................. B60K 1/00
(52) U.S. Cl. ...................... 180/65.5; 180/242; 180/208; 180/908
(58) Field of Search ................................ 180/209, 210, 180/213, 242, 237, 245, 65.1, 65.5, 89.13, 906, 8.2, 7.1, 345, 208, 907, 908, 21, 8.7, 901; 280/647

(56) References Cited

U.S. PATENT DOCUMENTS

| 1,651,292 A | * | 11/1927 | Ramage ...................... 180/209 |
| 2,742,973 A | * | 4/1956 | Johannesen .................. 180/8.2 |
| 2,751,027 A | * | 6/1956 | McLaughlin ................. 180/21 |
| 3,638,745 A | * | 2/1972 | Floyd .......................... 180/8.2 |
| 3,730,287 A | * | 5/1973 | Fletcher et al. .......... 180/7.1 X |
| 4,089,542 A |   | 5/1978 | Westerman |
| 4,558,758 A | * | 12/1985 | Littman et al. ............... 180/8.1 |
| 4,645,222 A | * | 2/1987 | Hester ..................... 180/8.2 X |
| 4,790,800 A | * | 12/1988 | Towes et al. |
| 5,137,101 A | * | 8/1992 | Schaeff ........................ 180/8.1 |
| 5,857,533 A | * | 1/1999 | Clewett ........................ 180/8.1 |
| 5,975,225 A | * | 11/1999 | Kamen et al. ................ 180/7.1 |
| 6,112,843 A | * | 9/2000 | Wilcox et al. ........... 180/8.2 X |
| 6,267,196 B1 | * | 7/2001 | Wilcox et al. .............. 180/347 |

FOREIGN PATENT DOCUMENTS

| DE | 2202812 | 8/1972 |
| DE | 9305543 | 7/1993 |
| EP | 0537698 A1 | 4/1993 |
| GB | 2307453 A | 5/1997 |

\* cited by examiner

Primary Examiner—Brian L. Johnson
Assistant Examiner—Bryan Fischmann
(74) Attorney, Agent, or Firm—Crowell & Moring LLP

(57) ABSTRACT

A single-seater motor vehicle includes (1) a support body having a plurality of supporting arms that are mounted in a horizontally and vertically displaceable manner; (2) a vehicle seat arranged on a support body; (3) a control device; and (4) a plurality of wheels, wherein each of said wheels is arranged adjustably or pivotably on a supporting arm. The support body the supporting arms can be set in at least three positions by automatic or manual adjustment of the vehicle seat height.

14 Claims, 3 Drawing Sheets

ONE-SEAT MOTOR VEHICLE

BACKGROUND AND SUMMARY OF THE INVENTION

The invention relates to a single-seater motor vehicle having a vehicle seat which is arranged on a chassis and has a control device, and having wheels which are arranged adjustably or pivotably on the chassis and at least two of which are provided with drives making at least two driving speeds possible.

A single-seater motor vehicle of this type is disclosed in European patent document 0 537 698 A1. This document describes a vehicle in the manner of an electric wheelchair which is operated by electric motors and in which arrangements are made to enable the wheels to be pivoted upwards, so that this vehicle can also run on chains which are assigned to the chassis next to the wheels. This refinement even permits the vehicle to travel up or down steps, for example.

The present invention proceeds from the consideration that the passenger cars currently used as individual means of transportation are not suitable from environmental aspects for use over short distances.

It has also been disclosed (German patent document 22 02 812) to provide small vehicles which are designed such that they can be folded together in order to be able to undertake a change to the normal dimensions in order to get into a parking space, for example. The folding car disclosed in Japanese Utility Model Application 8874/1984 also serves a similar purpose, which folding car is designed in such a manner that part of the rear portions of the vehicle can be folded forwards into the upwardly folded front part of the vehicle. Finally, U.S. Pat. No. 4,089,542 discloses a foldable small car in which the windshield frame and roll bar can be folded in flat, so that the vehicle can be accommodated, for example in a corresponding holding container of a relatively large motor home.

However, all of the known small vehicles, even the electric wheelchair mentioned at the beginning, do not permit adaptation to individual transportation in such a manner that the vehicle (for example when folded together) can be integrated in a public means of transportation or in a passenger car, for example as a front-passenger seat. The known small vehicles also cannot be used as a shopping means, for example in pedestrian zones, and as a micro vehicle for relatively short distances.

The present invention is therefore based on the object of designing a single-seater motor vehicle of the type mentioned at the beginning in such a manner that it can be used in the abovementioned sense for various types of transportation.

In order to achieve this object, provision is made in the case of a single-seater motor vehicle of the type mentioned at the beginning, for the chassis to consist of a support for the vehicle seat and of supporting arms, which are mounted in a horizontally and vertically pivotable manner thereon, for the wheels, and for different vehicle combinations for different application purposes to be realized by means of automatic or manual adjustment of the wheel base, the track width and/or the seat height.

The refinement according to the invention therefore offers the advantage of a small vehicle being able to cover areas of use which are suited to individual transportation and in which previously known individual vehicles, such as the previously known small vehicles, could not be deployed and used.

In an embodiment of the invention, provision may be made for the supporting arms and the support to be able to be set in at least three positions, in which a) in the first position the longest wheel base and—at least for the rear wheels—the greatest track width are obtained, so that in this position the vehicle can also be adapted to speeds which are observed in urban traffic, b) in the second position the greatest seat height and, with respect to position a), a smaller wheel base and smaller track width are obtained, the vehicle being able to be used in this position, by combining it with a low-speed driving mode, for shopping in pedestrian zones, for example, and c) in the third position supporting arms and support are folded up very small and one nested in the other, so that in this position the vehicle can easily be transported or, as indicated earlier, can be integrated in public means of transportation or else directly as a vehicle seat in private passenger cars.

In an embodiment of the invention, the novel motor vehicle is characterized by two front supporting arms protruding from the support in the direction of travel and two rear supporting arms protruding from the support in the opposite direction, at least the two rear supporting arms being provided with driven wheels.

In an embodiment of the invention, a respective electric motor can be provided as the drive in the vicinity of the hubs or integrated in the wheel hubs, which motor obtains energy from a battery arranged in the support. The operating radius of such an electric vehicle can be selected such that it is sufficiently large in order to ensure practical use. It would thus, for example, be conceivable for the novel motor vehicle, integrated as a seat in a previously known passenger car, to be unloaded at a car park situated at the edge of a town, brought into position a) and used as a means of transportation for the journey into the town. Once there it is converted to operating mode b) (low-speed driving mode) and can then be used as a shopping aid.

In an embodiment of the invention, the supporting arms can be designed as extendable and foldable mechanisms, the front supporting arms expediently being mounted and being displaceable on a sliding rail. The rear supporting arms can expediently be designed as articulated arms which can be folded in, in which case in a development of the invention, one of these articulated arms is designed as a triple lever arrangement. A triple pivot head, which is coupled to an articulated arm of the front supporting arms, is arranged rotatably on the support. This refinement therefore makes it possible simultaneously to retract the front supporting arms mounted on a sliding rail and to fold together the rear supporting arms to position c), if the triple pivot head is correspondingly adjusted. The low-speed driving position can also be set with the aid of this pivot head which, finally, also permits the complete extension of all of the supporting arms into the high-speed driving mode.

In an embodiment of the invention, the rear supporting arms, at least, can also be pivoted about a vertical axis in order to change the track width. In this arrangement, the adjusting drives for the supporting arms can be controlled electrically since the driving system for the novel vehicle is also electric.

BRIEF DESCRIPTION OF THE DRAWINGS

The invention is illustrated in the drawing with reference to an exemplary embodiment and is explained in the following. In the drawing.

DETAILED DESCRIPTION OF THE INVENTION

Figure 1:
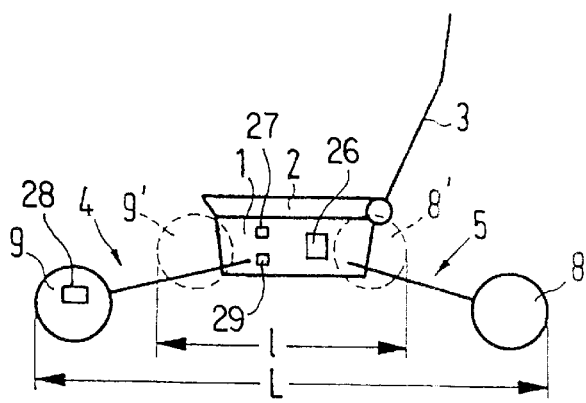
FIG. 1 shows a schematic side view of a small vehicle developed according to the invention.
Figure 2:
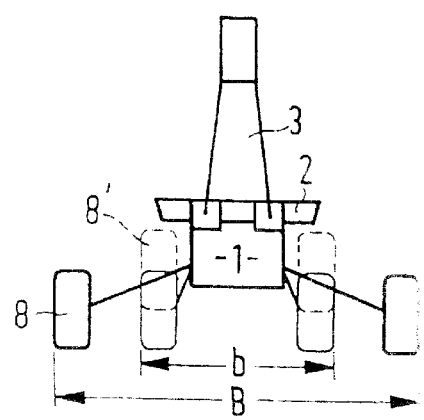
FIG. 2 shows the rear view of the vehicle of FIG. 1.

The undercarriage concept shown schematically in FIGS. 1 and 2 reveals that a support body 1 for a vehicle seat 2, which is designed as a comfortable seat (with a seat back 3), is provided, on which support body 1 a front undercarriage half 4 and a rear undercarriage half 5 are mounted. The front undercarriage half 4 and the rear undercarriage half 5 can also be seen in FIG. 3. They are designed as independent mechanisms, but cannot be retracted or adjusted entirely independently of each other. A battery 26 may be arranged in the support body.

The rear undercarriage half 5 essentially consists of two double lever arms 6 and 7 with a rear wheel 8 having its own electric drive, for example in the form of an electric motor integrated in the wheel hub, being mounted at each of their ends. These double lever arms 6, 7 can be pivoted out laterally and rearwards at the same time, as will be explained further with reference to FIGS. 4, 8 and 10. The double lever arms 6, 7, as FIG. 2 shows, protrude laterally rearwards resulting in a track width B. By pivoting these double lever arms 6, 7 in, this track width B can be reduced in size to width b which corresponds to the track width of the front undercarriage half 4. In the folded-up mode (FIGS. 9, 10), the double lever arms 6 and 7 are pushed together below the support frame, with the result that the rear wheels assume the position 8' in FIGS. 1 and 2.

Figure 3:
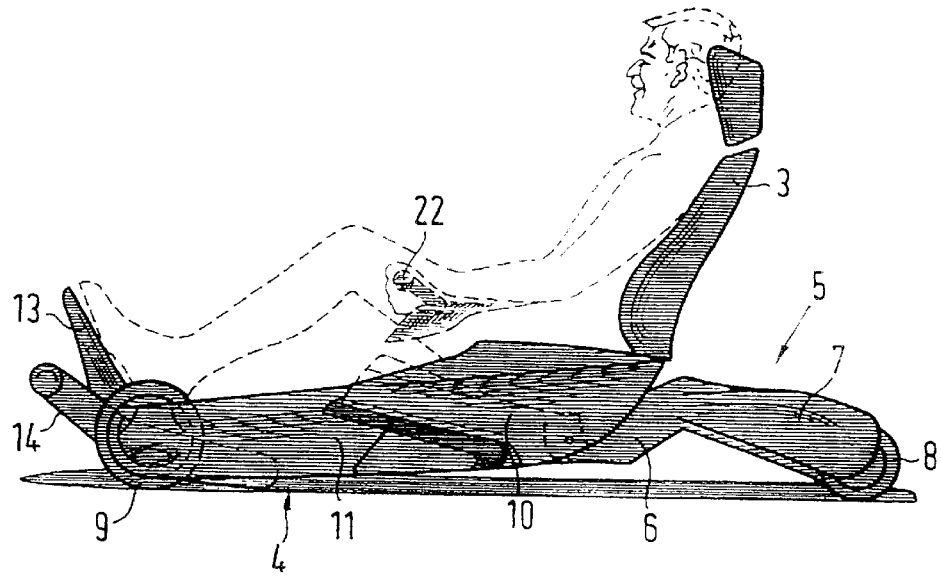
FIG. 3 shows an embodiment of a motor vehicle according to the invention, in a first setting position in which the vehicle is situated in the so-called high-speed driving mode.

The vehicle length, which is determined by the distance L (FIG. 1) which is measured in each case from the outer edges of the rear wheels 8 and of the two front wheels 9, can be reduced to the length l in the folded-up state in which the front wheels are pushed into the position 9'. FIG. 3 furthermore reveals that the support body 1 has lateral panelling parts 10 behind which the double lever arm 6, 7 and part of the supporting arms for the front wheels 9 are folded together if the vehicle is brought into the position according to FIGS. 9 and 10.

Figure 4:
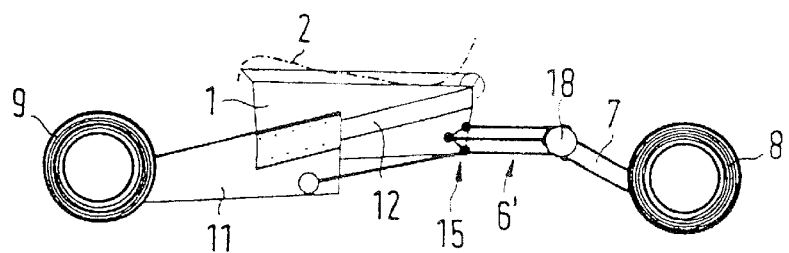
FIG. 4 shows the schematic representation of the supporting-mechanism arrangement according to the invention for the driving position shown in FIG. 3.
Figure 10:
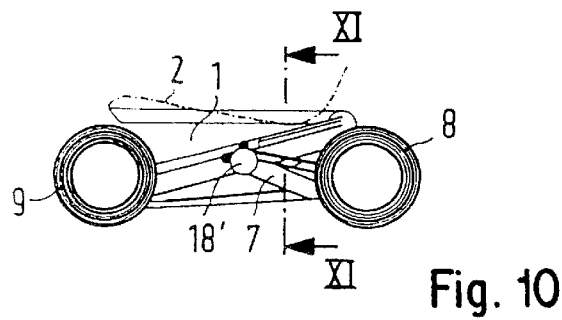
FIG. 10 shows the supporting frame of the vehicle according to FIGS. 4 and 8, but in the transportation and integration mode position.
Figure 11:
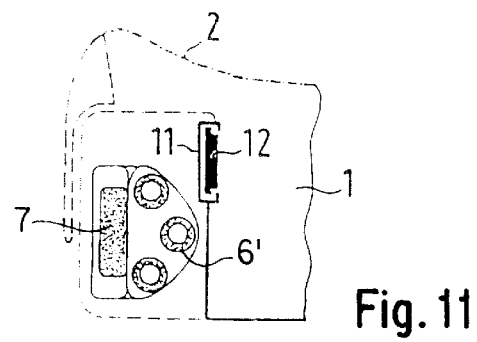
FIG. 11 shows a schematic section along the line XI through the vehicle of FIG. 10.

FIG. 4 makes it clear that the front wheels are mounted on a supporting arm 11 which, together with a sliding rail 12 mounted fixedly on the support body 1, makes it possible for them to be pushed out into the position shown according to FIG. 4 and to be retracted into the position shown in FIG. 10. This front undercarriage half 4 is therefore designed as a push-out module. The track width of this part cannot be changed. When the supporting arm 11, which is designed as a push-out part, is retracted, its casing encloses both the lower seat half and the folded-in lever arms (see FIG. 10).

At the front end of the front undercarriage half 4, which is correspondingly reinforced by means of the shaping, there is situated a fold-out footrest 13. The suspension mounts for the steerable front wheels are mounted to the sides of the footrest. Below this footrest 13 there can be arranged a climbing aid in the form of a revolving band 14 or a chain which, in the low-speed driving mode according to FIGS. 7 and 8, can assist in overcoming differences in the pathway, such as, for example, steps or access ramps.

It follows from the above that the novel motor vehicle, as seen from above, has a wedge shape whose point lies in the direction of travel.

The overall concept has been undertaken in such a manner that the novel motor vehicle can be operated in a safe manner in traffic within the specified operating modes. Thus, a design for a driving speed of up to a maximum of 50 km/h is provided for the high-speed driving mode according to FIGS. 3 and 4 and a design for a maximum of 6 km/h is provided for the low-speed driving mode according to FIGS. 7 and 8. This primarily means that rollover resistances are produced in all positions, especially for urban infrastructures with slopes and obstacles. The wheel spacing and track width, in particular of the rear wheels, can therefore be matched to the necessary speeds, turning circles and position of the center of gravity.

For the high-speed driving mode envisaged in FIGS. 3 and 4, the design can also be undertaken in such a manner that the seat position is placed such that the eye level is aligned with that of passenger-car drivers. In contrast, for the low-speed driving mode according to FIGS. 7 and 8, the eye level is intended to be aligned approximately with that of pedestrians. In the low-speed driving mode according to FIGS. 7 and 8 a type of standing seat is therefore provided. Of course, elements such as suspension, steering, and brakes are to be appropriately integrated, but this does not pose any difficulties.

The high-speed driving mode outlined in FIGS. 3 and 4 has to meet the most extreme requirements with regard to the rollover behavior. If, on account of the envisaged short operating range of about 15 km (up to a maximum of 25 km) and the relatively low final speed of up to a maximum of 50 km/h, the vehicle is designed in terms of acceleration in a sporty manner, the center of gravity is displaced noticeably forwards with respect to the rear wheel-contact point.

The front push-out mechanism of the supporting arm 11 is designed in such a manner that its casing elements enclose the seat base, i.e. the support body 1, from below in a slight U-shape. The sliding rails 12 on the side surfaces of the support body 1 ensure a linear displacement of the supporting arm 11 at an acute angle to the seat base. The shell of the front undercarriage module therefore becomes detached during the extension from the bottom of the seat base, and in conjunction with a spindle drive, which is not shown but can be placed, for example, at the rear end of the support body 1, a trapezoidal structure is produced. This can be designed such that it is sufficiently stable.

In the high-speed driving mode the rear undercarriage half 5 has two tasks. For one thing, the wheel base has to be made as long as possible to the rear with the center of gravity situated as low as possible. For another thing, the track of the rear wheels has to be distinctly widened. The double lever arms 6, 7 for the rear wheels 8 therefore undertake a type of cantilever function. In the exemplary embodiment a solution has been proposed for the double lever arms 6, 7, in which the height adjustment of the seat, the longitudinal adjustment of the wheel base and the adaptation of the track can take place in a single adjusting sequence. In addition, comfortable swinging suspension can be integrated into the articulated mechanism of the double lever arms 6, 7.

Figure 5:
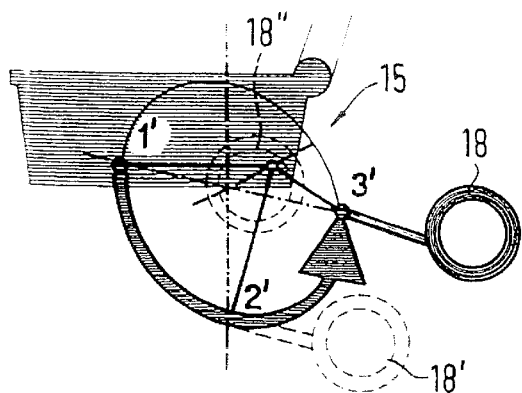
FIG. 5 shows a detail representation of the triple lever head used in the supporting-mechanism construction according to FIG. 4.

As FIG. 5 shows, a triple pivot head 15 for three parallel-guided arms of the triple lever arm 6' is provided. The three arms of the triple lever arm 6' are mounted in an articulated manner on this rotatable triple pivot head 15. Therefore, if the head, as shown in FIG. 5, is brought at an articulation point from position 3' into position 2', rotation of this triple pivot head 15 causes the double lever consisting of triple lever arm 6' and lever arm 7 to buckle, in the manner shown in FIG. 8. As FIG. 5 reveals, the spatial curve which is described by the connecting point of the lever arms is a downwardly directed semicircle whose area defined in the space assumes an acute angle both perpendicularly and also in the longitudinal direction to the side surface of the support body 1. When the pivot head 15 is adjusted, it is therefore also possible not only to buckle the double lever consisting of triple lever arm 6' and lever arm 7 into the position according to FIG. 8, but also to change the track width. Of course, it would also be possible to provide a separate mounting about a vertical axis about which the double lever consisting. of triple lever arm 6' and lever arm 7 additionally pivot in order to be brought into the position according to FIG. 8. In this case, FIG. 5 also schematically shows the particular position of the joint 18 between the double lever consisting of triple lever arm 6' and lever arm 7 when the pivot head 15 is rotated (e.g., 18' and 18").

Figure 6:
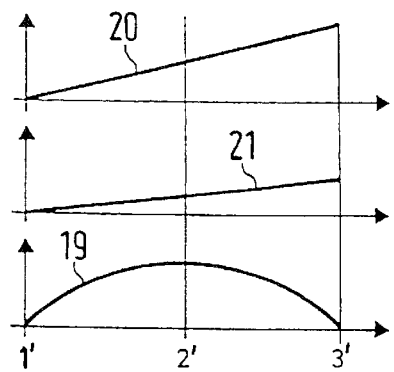
FIG. 6 shows a diagram which shows the change in the seat height, the track width and the wheel base of the novel vehicle in the three envisaged positions.

FIG. 6 makes it clear as to how various parameters of the novel vehicle change when the pivot head rotates according to FIG. 5. Thus, the curve 19 for the change in the seat height is shown at the bottom of FIG. 6. It can be seen that the seat height is at the same level in the high-speed driving mode according to FIGS. 3 and 4 and in the transportation mode according to FIGS. 9 and 10, while it is highest (position 2') in the low-speed driving mode according to FIGS. 7 and 8. The wheel base decreases from position 3' (high-speed driving mode according to FIGS. 3 and 4), in accordance with the curve 20 continuously until it reaches the transportation mode (position 1'). The same is also true of the track width according to the curve 21.

Figure 7:
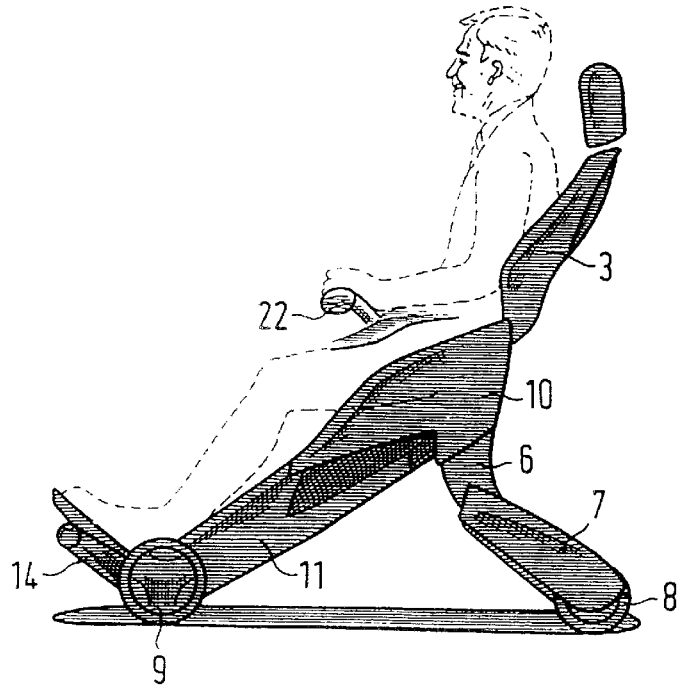
FIG. 7 shows a side view similar to FIG. 3 of the novel vehicle, but in the low-speed driving mode position.
Figure 8:
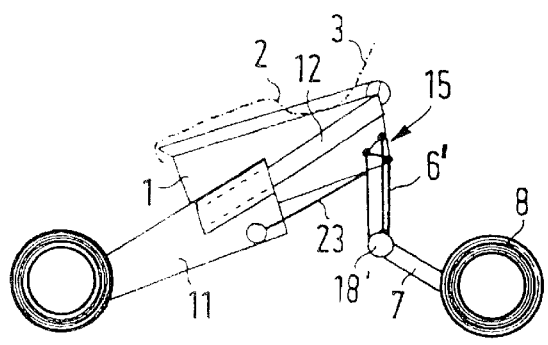
FIG. 8 shows the supporting frame of the vehicle in the position according to FIG. 7.

FIGS. 7 and 8 reveal that in the low-speed driving mode the novel vehicle forms a type of standing seat, as indicated previously. FIG. 7 also shows that the vehicle can be controlled by a so-called joystick control 22 which is assigned to the vehicle at a suitable location. However, FIG. 8 also shows that the supporting arm 11 which can be pushed out and pulled back is connected by a link 23 to the pivot head 15 which can be moved between the three positions by a control motor. The supporting arm 11 is brought, optionally by additional gears, along its sliding rail 12 into the retracted position according to FIG. 10, if the double lever arm 6, 7 is brought into the folded together position according to FIG. 10 by movement of the pivot head 15.

Figure 9:
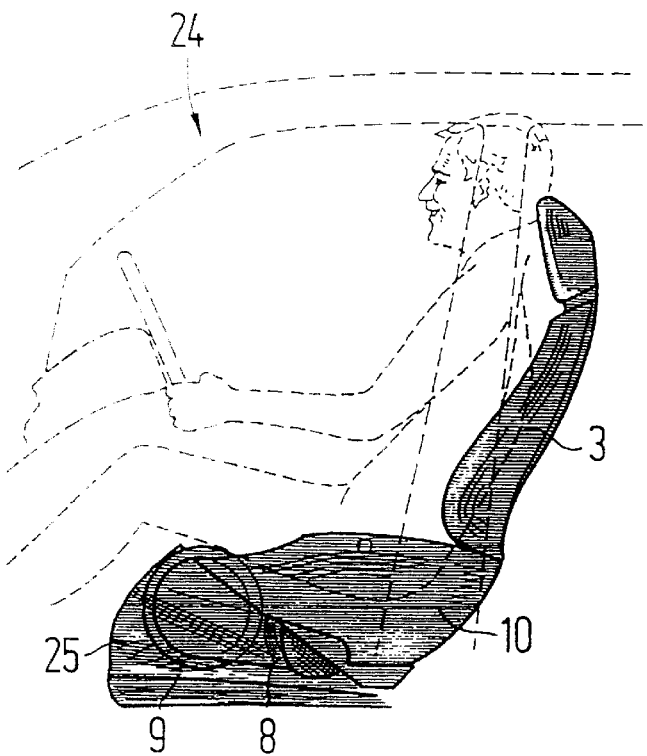
FIG. 9 shows the side view of the vehicle in the transportation and integration mode, integrated in a passenger car as a front-passenger seat or drivers seat.

FIG. 9 makes it clear that the vehicle, in the so-called transportation or integration mode according to FIG. 10, can also be inserted into a passenger car 24, instead of a vehicle seat. By means of suitable holding guides 25, which have to be combined with docking and lifting devices, the twin use of the novel vehicle both as a vehicle with two design modes and also as a vehicle seat is thereby possible.

A more detailed description is not given of the fact that the steering can likewise be carried out electrically and that the support body 1 contains corresponding electric batteries which can be used, for one thing, in order to supply power to the steering assembly 27, adjusting drive 28, and other auxiliary assemblies, such as, for example, control motors 29 for the pivot head 15 or the like, but of course also for supplying power to the electric motors serving as the drive. Likewise not shown is the fact that brake and acceleration pedals can be integrated into the foot rests 13, if this is desired and if equivalent functions are not to be assigned to the joystick control.

FIG. 8 moreover also shows that in the position of the low-speed driving mode, the rear-wheel limb or the lever arm 7 remains in a virtually unchanged position, while the triple lever arm 6' is situated perpendicularly downwards rotated through virtually 90°. This changes completely in the transportation mode according to FIG. 10. In this position, the lever arm 7 and triple lever arm 6' are situated virtually one in front of the other in order to ensure that the space required is as small as possible.

What is claimed is:

1. A single-seater motor vehicle, comprising:
   a support body comprising a plurality of supporting arms that are mounted in a horizontally and vertically displaceable manner;
   a vehicle seat arranged on the support body;
   a control device; and
   a plurality of wheels arranged adjustably or pivotably on the support body, wherein each of said wheels is mounted on a supporting arm, wherein at least two of the wheels each comprise a drive for at least two driving speeds;
   wherein the support body and the supporting arms can be set in at least three positions by automatic adjustment of the vehicle seat height,
   wherein said at least three positions comprise:
      a first position for high-speed driving, wherein at least a rear track width and a wheel base are greater than in a second position and a third position;
      a second position for low-speed driving having a smaller wheel base and a smaller track width than in the first position and wherein the vehicle seat height is greater than the first position and the third position; and
      a third position wherein the supporting arms and the support body are folded up and nested in one another.

2. A motor vehicle according to claim 1, wherein the plurality of supporting arms comprise:
   two front supporting arms protruding from the support body in a direction of travel, and
   two rear supporting arms protruding from the support body in a direction opposite the front supporting arms, wherein at least the rear supporting arms comprise wheels with drives.

3. A motor vehicle according to claim 1, wherein the drive comprise electric motors that are arranged in the vicinity of wheel hubs.

4. A motor vehicle according to claim 3, wherein the electric motors are integrated into the wheel hubs.

5. A motor vehicle according to claim 1, further comprising a battery arranged in the support body.

6. A motor vehicle according to claim 2, wherein the supporting arms are extendable and foldable.

7. A motor vehicle according to claim 2, wherein the front supporting arms are mounted on a sliding rail of the support body.

8. A motor vehicle according to claim 7, wherein the sliding rail is mounted at a side of the support body and is inclined forward at an angle to the vehicle seat surface.

9. A motor vehicle according to claim 2, wherein the rear supporting arms are articulated arms that can be folded.

10. A motor vehicle according to claim 9, wherein at least one of the articulated arms is a triple lever.

11. A motor vehicle according to claim 10, wherein the triple lever is articulated on a rotatable swivel head on the support body at an angle perpendicularly and longitudinally to the direction of travel.

12. A motor vehicle according to claim 11, wherein the swivel head is coupled to an articulated lever of the front supporting arms.

13. A motor vehicle according to claim 2, wherein at least the rear supporting arms can be pivoted about a vertically extending axis to change the track width.

14. A motor vehicle according to claim 2, further comprising at least one of a steering assembly, a control motor, or an adjusting drive.

* * * * *